(12) United States Patent
Kiribayashi

(10) Patent No.: US 7,868,748 B2
(45) Date of Patent: Jan. 11, 2011

(54) COLLISION DETECTION SENSOR FOR VEHICLE

(75) Inventor: Shinichi Kiribayashi, Anjo (JP)

(73) Assignee: Denso Corporation, Kariya (JP)

( * ) Notice: Subject to any disclaimer, the term of this patent is extended or adjusted under 35 U.S.C. 154(b) by 287 days.

(21) Appl. No.: 12/217,747

(22) Filed: Jul. 8, 2008

(65) Prior Publication Data
US 2009/0015391 A1     Jan. 15, 2009

(30) Foreign Application Priority Data
Jul. 13, 2007   (JP) .............................. 2007-184207

(51) Int. Cl.
*B60Q 1/00* (2006.01)
(52) U.S. Cl. .......................... 340/436; 701/45; 180/274
(58) Field of Classification Search ................. 340/436, 340/435; 701/45; 180/274, 268; 280/735; 293/107, 110, 117
See application file for complete search history.

(56) References Cited

U.S. PATENT DOCUMENTS

| 7,637,545 B2 * | 12/2009 | Takahashi et al. ........... 293/132 |
| 2005/0116817 A1 | 6/2005 | Mattes et al. |
| 2006/0087417 A1 | 4/2006 | Kiribayashi |

FOREIGN PATENT DOCUMENTS

| JP | 2004-268627 | 9/2004 |
| JP | 2005-538881 | 12/2005 |
| JP | 2006/036014 | 2/2006 |
| JP | 2006-512245 | 4/2006 |
| JP | 2006-117157 | 5/2006 |
| JP | 2006-321442 | 11/2006 |
| WO | WO 03/082639 | 10/2003 |
| WO | WO 2004/058545 | 7/2004 |
| WO | WO 2006/123236 | 11/2006 |
| WO | WO2006123236 | * 11/2006 |

OTHER PUBLICATIONS

Office action dated Feb. 4, 2009 in Japanese Application No. 2007-184207.

* cited by examiner

*Primary Examiner*—George A Bugg
*Assistant Examiner*—Hongmin Fan
(74) *Attorney, Agent, or Firm*—Harness, Dickey & Pierce, PLC

(57) ABSTRACT

A chamber room is located between a bumper reinforcement and a bumper cover in a vehicle front-rear direction. The chamber room is deformed with a relative movement of the bumper cover to the bumper reinforcement in the event of the collision. A pressure sensor is located in the chamber room to detect a pressure change in the chamber room. A touch sensor is located between the bumper reinforcement and the bumper cover to detect contact with the bumper cover. The touch sensor and the chamber room are located at different positions in a vehicle top-bottom direction. It is determined whether collision occurs based on the detection results of the pressure sensor and the touch sensor.

14 Claims, 2 Drawing Sheets

_US 7,868,748 B2_

COLLISION DETECTION SENSOR FOR VEHICLE

CROSS REFERENCE TO RELATED APPLICATION

This application is based on and incorporates herein by reference Japanese Patent Application No. 2007-184207 filed on Jul. 13, 2007.

FIELD OF THE INVENTION

The present invention relates to a collision detection sensor for detecting a collision of a vehicle with an object.

BACKGROUND OF THE INVENTION

Conventionally, various types of sensors have been proposed that detect a collision of a vehicle with an object. For example, US 2005/0116817 corresponding to JP-A-2005-538881 discloses a front sensor having a chamber room where a sensing element is placed. The front sensor determines that a collision occurs, when the sensing element detects a pressure change in the chamber room due to deformation of the chamber room. US 2006/0087417 corresponding to JP-A-2006-117157 discloses an object determination sensor that determines what kind of object a vehicle collides with based on a pressure change in a sealed chamber room located between a bumper cover and a bumper reinforcement. However, pressure in such a chamber room may change due to factors other than a collision. For example, a vehicle vibration and a temperature change may cause a pressure change in the chamber room.

SUMMARY OF THE INVENTION

In view of the above-described problem, it is an object of the present invention to provide a collision detection sensor for certainly detecting a collision of a vehicle with an object.

A collision detection sensor for detecting a collision of a vehicle with an object includes a bumper reinforcement, a bumper cover, a chamber member, a movable member, a pressure sensor, a touch sensor, and a collision determination circuit. The bumper reinforcement extends in a vehicle left-right direction and covers space ahead of the bumper reinforcement in a vehicle front-rear direction. The bumper cover can move toward a vehicle rear direction relative to the bumper reinforcement in the event of a collision. The chamber member defines a chamber room therein and is located between the bumper reinforcement and the bumper cover. The chamber room is deformable with the relative movement of the bumper cover to the bumper reinforcement. The movable member moves with the relative movement of the bumper cover to the bumper reinforcement. The pressure sensor detects a pressure change in the chamber room. The touch sensor is located ahead of the bumper reinforcement in the vehicle front-rear direction and detects contact with the movable member. The touch sensor and the chamber room are located at different positions in a vehicle top-bottom direction. The determination circuit determines whether the collision occurs based on the detection results of the pressure sensor and the touch sensor.

BRIEF DESCRIPTION OF THE DRAWINGS

The above and other objectives, features and advantages of the present invention will become more apparent from the following detailed description made with check to the accompanying drawings. In the drawings.

DETAILED DESCRIPTION OF THE PREFERRED EMBODIMENTS

First Embodiment

Figure 1:
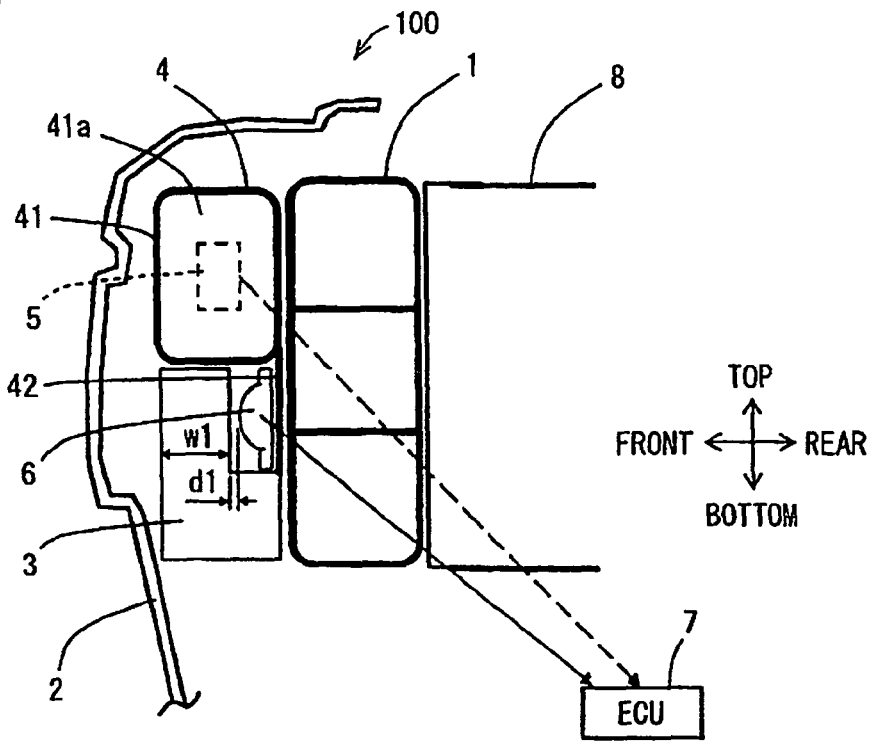
FIG. 1 is a diagram illustrating a perspective side view of a collision detection sensor according to a first embodiment of the present invention.

Referring to FIG. 1, a collision detection sensor 100 according to a first embodiment of the present invention includes a bumper reinforcement 1, a bumper cover 2, a bumper absorber 3, a chamber member 4, a pressure sensor 5, a touch sensor (i.e., contact sensor) 6, and an electronic control unit (ECU) 7. The collision detection sensor 100 is mounted on a vehicle and detects a collision of the vehicle with an object, in particular, a pedestrian.

The bumper reinforcement 1 is part of a vehicle's frame (i.e., body) and extends in a vehicle left-right direction. For example, as shown in FIG. 1, the bumper reinforcement 1 is a metallic hollow body with two dividers. The dividers extend in the vehicle left-right direction so that the bumper reinforcement 1 can have three inner rooms that are separated in a vehicle top-bottom direction. The bumper reinforcement 1 is fixed to a front end of a front side member 8. The front side member 8 is located at each side of the vehicle in the vehicle left-right direction.

The bumper cover 2 is located at a front end of the vehicle and covers space ahead of the bumper reinforcement 1 in a vehicle front-rear direction. In the event of a frontal collision with an object ahead of the vehicle, the bumper cover 2 first comes in contact with the object.

For example, as shown in FIG. 1, the bumper absorber 3 has a cutout portion that causes the bumper absorber 3 to have a L-shaped vertical cross-section taken in the vehicle front-rear direction. The bumper absorber 3 can be, for example, made of resin foam. The bumper absorber 3 is located between the bumper reinforcement 1 and the bumper cover 2 and extends in the vehicle left-right direction. The bumper absorber 3 is fixed to the bumper reinforcement 1 in such a manner that the cutout portion of the bumper absorber 3 faces the vehicle top direction and the vehicle rear direction.

The bumper absorber 3 supports the bumper cover 2 in such a manner that the bumper cover 2 can move toward the vehicle rear direction relative to the bumper reinforcement 1. A length of the bumper absorber 3 in the vehicle left-right direction is slightly less than a length of the bumper reinforcement 1 in the vehicle left-right direction. A height of the bumper absorber 3 in the vehicle top-bottom direction is about one-half of a height of the bumper reinforcement 1 in the vehicle top-bottom direction. A width of the bumper absorber 3 in the vehicle front-rear direction gets smaller from its middle toward its ends in the vehicle left-right direction. Thus, the bumper absorber 3 is located nearer to the bumper cover 2 in the middle than the ends, so that a front face of the bumper absorber 3 can be curved to follow the shape of the bumper cover 2. That is, when viewed from the top of the vehicle, the front face of the bumper absorber 3 is arc-shaped.

In the event of the frontal collision, the bumper absorber 3 is deformed to absorb collision impact force exerted on the object. Therefore, for example, when the bumper cover 2 collides with a pedestrian, the bumper absorber 3 helps reduce the collision impact force exerted on legs of the pedestrian.

The chamber member 4 includes a rectangular box-shaped body portion 41 and a plate-shaped extension portion 42 integrally formed with the body portion 41. The body portion 41 defines a substantially-sealed chamber room 41a therein. The extension portion 42 extends downward in the vehicle top-bottom direction from a rear surface of the body portion 41. A length of the body portion 41 in the vehicle left-right direction is substantially equal to the length of the bumper absorber 3. A height of the body portion 41 in the vehicle top-bottom direction is about one-half of the height of the bumper reinforcement 1. A width of the body portion 41 in the vehicle front-rear direction is substantially equal to the width of the bumper absorber 3. The extension portion 42 extends to coincide with the rear surface of the body portion 41 in the vehicle top-bottom direction. A height of the extension portion 42 from the body portion 41 in the vehicle top-bottom direction is substantially equal to a height of the cutout portion of the bumper absorber 3 in the vehicle top-bottom direction. A length of the extension portion 42 in the vehicle left-right direction is substantially equal to the length of the body portion 41.

The chamber member 4 is a single-piece of readily deformable resin. The chamber member 4 can elastically or inelastically deform. The chamber member 4 is located between the bumper reinforcement 1 and the bumper cover 2. Specifically, the rear surface of the body portion 41 is in contact with a front surface of the bumper reinforcement 1 in the vehicle front-rear direction. The body portion 41 is located above the bumper absorber 3 in the vehicle top-bottom direction. The extension portion 42 is in contact with the front surface of the bumper reinforcement 1 and located in the cutout portion of the bumper absorber 3. That is, in the cutout portion of the bumper absorber 3, there is space between a front surface of the extension portion 42 and a rear surface of the bumper absorber 3 in the vehicle front-rear direction.

As mentioned previously, in the event of the frontal collision, the bumper cover 2 moves toward the vehicle rear direction relative to the bumper reinforcement 1. As a result, the body portion 41 of the chamber member 4 is pressed between the bumper reinforcement 1 and the bumper cover 2 and deformed in the vehicle front-rear direction. The body portion 41 can be deformed, even in the event of the frontal collision at an angle. Specifically, when the object collides with the upper corner of the bumper cover 2, the bumper cover 2 moves toward a vehicle rear-bottom direction relative to the bumper reinforcement 1. As a result, the body portion 41 is pressed between the bumper reinforcement 1 and the bumper cover 2 and deformed in the vehicle rear-bottom direction. In summary, in the event of the frontal collision, the body portion 41 can be deformed. The chamber room 41a is filled with gas such as air. The chamber room 41a can be completely hermetically sealed. Alternatively, the chamber room 41a can be partially sealed, provided that the pressure in the chamber room 41a can change according to the deformation of the body portion 41.

The pressure sensor 5 detects the pressure in the chamber room 41a of the chamber member 4. For example, the pressure sensor 5 is mounted on a right inner side wall of the body portion 41 in the vehicle left-right direction. The pressure sensor 5 transmits a pressure signal indicative of the detected pressure to the ECU 7. Thus, the collision of the bumper cover 2 with the object can be detected by detecting the pressure change in the chamber room 41a due to the deformation of the body portion 41 of the chamber member 4.

For example, the touch sensor 6 is a switch-type sensor and detects a contact with a moving object. The touch sensor 6 is mounted on the front surface of the extension portion 42 of the chamber member 4 and accommodated in the cutout portion of the bumper absorber 3. Therefore, the touch sensor 6 is located below the chamber room 41a in the vehicle top-bottom direction. The touch sensor 6 is mounted such that there is no contact between the bumper absorber 3 and the touch sensor 6 in a normal condition where no collision occurs.

When the collision of the bumper cover 2 with the object occurs, the bumper cover 2 moves toward the vehicle rear direction relative to the bumper reinforcement 1. As a result, the bumper absorber 3 is pressed between the bumper reinforcement 1 and the bumper cover 2 and deformed in the vehicle front-rear direction. In this case, due to the cutout portion, a lower portion (thicker portion) of the bumper absorber 3 is much deformed than an upper portion (thinner portion) of the bumper absorber 3. Therefore, the upper portion of the bumper absorber 3 moves toward the vehicle rear direction relative to the bumper reinforcement 1 and comes in contact with the touch sensor 6. Thus, the upper portion of the bumper absorber 3 can serve as a movable member. The touch sensor 6 detects the contact with the upper portion of the bumper absorber 3 and transmits a contact signal indicative of the detected contact to the ECU 7.

In FIG. 1, d1 represents a distance between the upper portion of the bumper absorber 3 and the touch sensor 6 in the vehicle front-rear direction, and w1 represents a width of the upper portion of the bumper absorber 3 in the vehicle front-rear direction. A collision detection sensitivity of the touch sensor 6 can be adjusted by changing at least one of the distance d1 and the width w1. The collision detection sensitivity of the touch sensor 6 is set less than a collision detection sensitivity of the pressure sensor 5.

The ECU 7 first determines whether the touch sensor 6 detects the contact with the bumper absorber 3. If the touch sensor 6 does not detect the contact with the bumper absorber 3, the ECU 7 concludes that there is no collision of the bumper cover 2 with the object. In contrast, if the touch sensor 6 detects the contact with the bumper absorber 3, the ECU 7 then determines whether the bumper cover 2 collides with the object based on the pressure change detected by the pressure sensor 5. Specifically, the ECU 7 determines whether the bumper cover 2 collides with a pedestrian based on a behavior of the pressure change in the chamber room 41a.

If the ECU 7 concludes that the bumper cover 2 collides with the pedestrian, the ECU 7 activates a pedestrian protection device (not shown). For example, the pedestrian protection device is installed on a hood (i.e., bonnet) of the vehicle and protects the pedestrian from the collision impact force. For example, the pedestrian protection device is a pop up hood (i.e., a deployable hood), a hood airbag, or the like.

As described above, the collision detection sensor 100 according to the first embodiment includes the touch sensor 6 in addition to the pressure sensor 5. The pressure sensor 5 detects the pressure change in the chamber room 41a of the body portion 41 of the chamber member 4. The touch sensor 6 detects the contact with the bumper absorber 3, which moves with the relative movement of the bumper cover 2 to the bumper reinforcement 1 in the event of the collision. Since the chamber room 41a (i.e., the body portion 41) and the touch sensor 6 are located at different positions in the vehicle top-bottom direction, the touch sensor 6 can detect the relative movement of the bumper cover 2 to the bumper reinforcement 1 without being substantially affected by the deformation of the body portion 41.

The ECU 7 determines that the collision occurs, only when both the pressure sensor 5 and the touch sensor 6 detect the collision. That is, the collision detection sensor 100 is configured in a redundant manner by using two sensors 5, 6. The collision detection sensitivity of the touch sensor 6 is set less than the collision detection sensitivity of the pressure sensor 5. Therefore, even when the pressure in the chamber room 41*a* changes due to factors other than the collision, the touch sensor 6 prevents the pedestrian protection device from being incorrectly activated. In this way, the touch sensor 6 serves as a safing sensor.

The chamber room 41*a* is located below the touch sensor 6 in the vehicle top-bottom direction. That is, the chamber room 41*a* is located near a hood (i.e., bonnet) of the vehicle. In the event of a typical pedestrian collision, the pedestrian lands on the hood after colliding with the bumper cover 2. Since the chamber room 41*a* is located near the hood, the pressure sensor 5 can certainly detect the collision of the hood with the pedestrian after the touch sensor 6 detects the collision of the bumper cover 2 with the pedestrian. Therefore, the collision detection sensor 100 can accurately detect the pedestrian collision.

Second Embodiment

A collision detection sensor 200 according to a second embodiment of the present invention is described below with reference to FIG. 2. The collision detection sensor 200 includes the bumper reinforcement 1, the bumper cover 2, a bumper absorber 13, a chamber member 14, the pressure sensor 5, the touch sensor 6, and the ECU 7.

Figure 2:
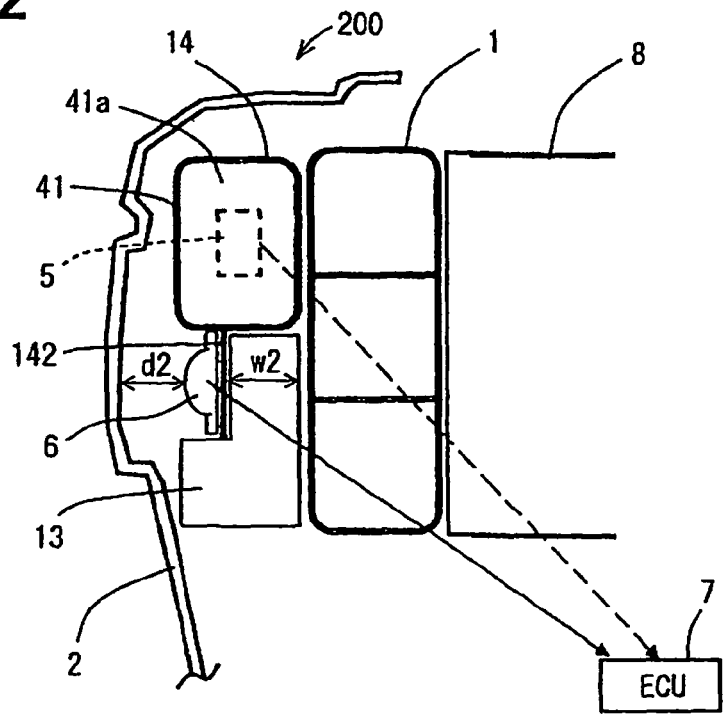
FIG. 2 is a diagram illustrating a perspective side view of a collision detection sensor according to a second embodiment of the present invention.

As shown in FIG. 2, the bumper absorber 13 has a cutout portion that causes the bumper absorber 13 to have a L-shaped vertical cross-section taken in the vehicle front-rear direction. For example, the bumper absorber 13 can be made of resin foam. The bumper absorber 13 is located between the bumper reinforcement 1 and the bumper cover 2 and extends in the vehicle left-right direction. A difference between the bumper absorbers 3, 13 of the first and second embodiments is in that the bumper absorber 13 is fixed to the bumper reinforcement 1 in such a manner that the cutout portion of the bumper absorber 13 faces the vehicle top direction and the vehicle front direction.

The chamber member 14 includes the rectangular box-shaped body portion 41 and a plate-shaped extension portion 142 integrally formed with the body portion 41. The body portion 41 defines the chamber room 41*a*. A difference between the extension portions 42, 142 of the first and second embodiments is in that the extension portion 142 is located substantially in the center of a bottom surface of the body portion 41 in the vehicle front-rear direction and extends downward in the vehicle top-bottom direction. A height of the extension portion 142 from the body portion 41 in the vehicle top-bottom direction is substantially equal to the height of the cutout portion of the bumper absorber 13. A length of the extension portion 142 in the vehicle left-right direction is substantially equal to the length of the body portion 41. The extension portion 142 is located in the cutout portion of the bumper absorber 13 and fixed to a front surface of the bumper absorber 13.

The touch sensor 6 is mounted on a front surface of the extension portion 142 of the chamber member 14 and accommodated in the cutout portion of the bumper absorber 13. Therefore, the touch sensor 6 is located below the chamber room 41*a* in the vehicle top-bottom direction. The touch sensor 6 is mounted such that there is no contact between the bumper cover 2 and the touch sensor 6 in a normal condition where no collision occurs. In the event of the front collision, the bumper cover 2 moves toward the vehicle rear direction relative to the bumper reinforcement 1. As a result, the bumper cover 2 comes in contact with the touch sensor 6.

In FIG. 2, $d_2$ represents a distance between the bumper cover 2 and the touch sensor 6 in the vehicle front-rear direction, and $w_2$ represents a width of the upper portion (i.e., thin portion) of the bumper absorber 13 in the vehicle front-rear direction. A collision detection sensitivity of the touch sensor 6 can be adjusted by changing at least one of the distance $d_2$ and the width $w_2$.

Like the collision detection sensor 100, the collision detection sensor 200 according to the second embodiment is configured in the redundant manner by using two sensors 5, 6. Specifically, the ECU 7 first determines whether the touch sensor 6 detects contact with the bumper cover 2. If the touch sensor 6 detects the contact with the bumper cover 2, the ECU 7 then determines whether the bumper cover 2 collides with the pedestrian based on the pressure change detected by the pressure sensor 5. Thus, the collision detection sensor 200 can have substantially the same effect as the collision detection sensor 100.

(Modifications)

The embodiments described above may be modified in various ways. For example, the touch sensor 6 can be mounted to a portion other than the extension portions 42, 142 of the chamber members 4, 14.

Figure 3:
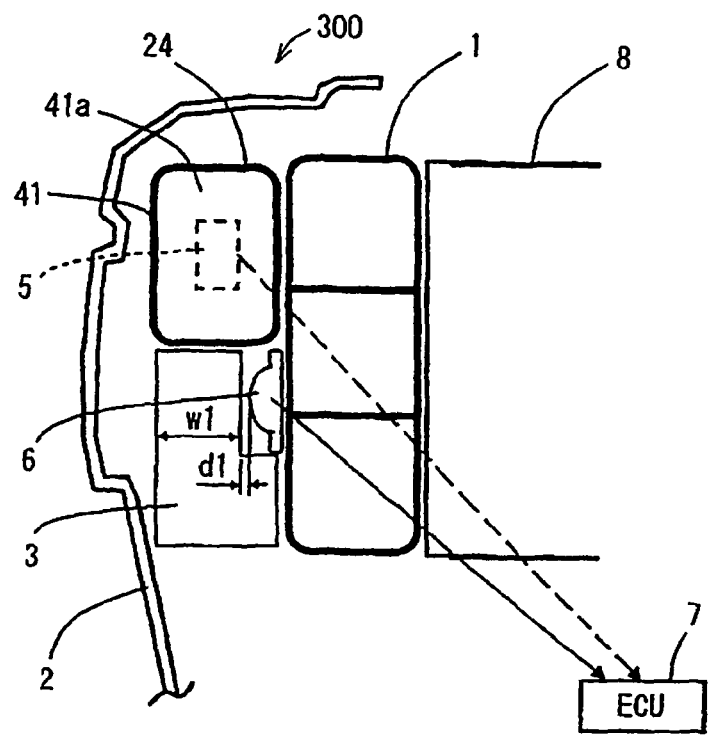
FIG. 3 is a diagram illustrating a perspective side view a collision detection sensor according to a modification of the collision detection sensor of FIG. 1.

FIG. 3 shows a collision detection sensor 300 according to a modification of the collision detection sensor 100 shown in FIG. 1. A chamber member 24 of the collision detection sensor 300 is constructed with only the body portion 41 for defining the chamber room 41*a*. That is, the chamber member 24 has no extension portion. The touch sensor 6 is mounted directly to the front surface of the bumper reinforcement 1 and accommodated in the cutout portion of the bumper absorber 3. The touch sensor 6 is mounted such that there is no contact between the bumper absorber 3 and the touch sensor 6 in the normal condition. In the event of the frontal collision, the bumper cover 2 moves toward the vehicle rear direction relative to the bumper reinforcement 1. As a result, the bumper absorber 3 is deformed and comes in contact with the touch sensor 6. In this way, the touch sensor 6 detects the collision.

Figure 4:
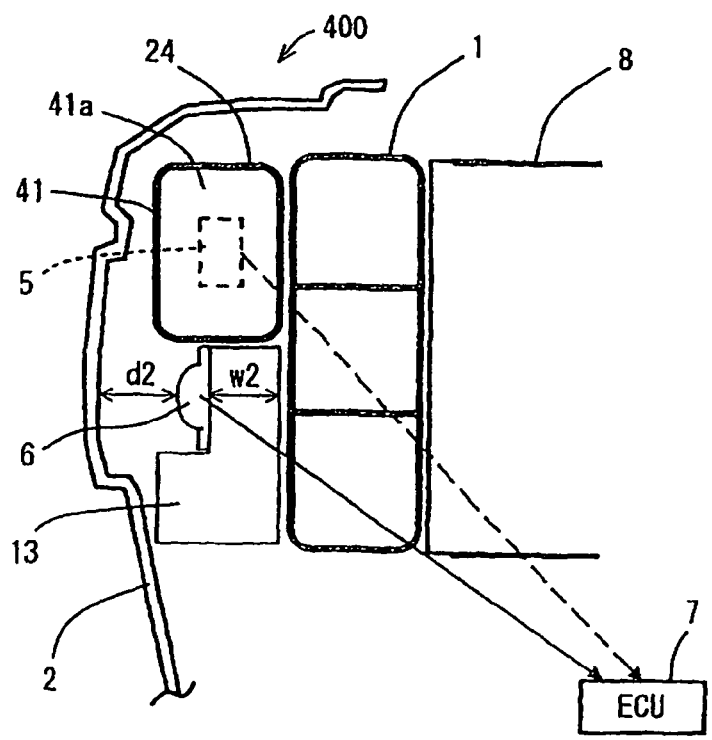
FIG. 4 is a diagram illustrating a perspective side view of a collision detection sensor according to a modification of the collision detection sensor of FIG. 2.

FIG. 4 shows a collision detection sensor 400 according to a modification of the collision detection sensor 200 shown in FIG. 2. In the collision detection sensor 400, the touch sensor 6 is mounted directly to the front surface of the bumper absorber 13 and accommodated in the cutout portion of the bumper absorber 13. In the event of the frontal collision, the bumper cover 2 moves toward the vehicle rear direction relative to the bumper reinforcement 1. As a result, the bumper cover 2 comes in contact with the touch sensor 6. In this way, the touch sensor 6 detects the collision.

Such changes and modifications are to be understood as being within the scope of the present invention as defined by the appended claims.

What is claimed is:

1. A collision detection sensor for detecting a collision of a vehicle with an object, the collision detection sensor comprising:

a bumper reinforcement extending in a vehicle left-right direction;

a bumper cover located to cover space ahead of the bumper reinforcement in a vehicle front-rear direction, the bumper cover being configured to move toward a vehicle rear direction relative to the bumper reinforcement in the event of the collision;

a chamber member defining a chamber room therein and located between the bumper reinforcement and the bumper cover, the chamber room being deformed with the relative movement of the bumper cover to the bumper reinforcement;

a movable member configured to move with the relative movement of the bumper cover to the bumper reinforcement;

a pressure sensor configured to detect a pressure change in the chamber room;

a touch sensor located ahead of the bumper reinforcement in the vehicle front-rear direction and detecting contact with the movable member, the touch sensor and the chamber room being located at different positions in a vehicle top-bottom direction; and a determination circuit that determines whether the collision occurs based on the detection results of the pressure sensor and the touch sensor, wherein the chamber member includes a body portion and an extension portion integrally formed with the body portion, the body portion defining the chamber room, the extension portion extending outward from an outer surface of the body portion, and wherein the touch sensor is mounted to the extension portion.

2. The collision detection sensor according to claim 1, wherein the determination circuit determines whether the collision occurs based on the detection result of the pressure sensor, only when the touch sensor detects the contact with the movable member.

3. The collision detection sensor according to claim 1, wherein the touch sensor is located below the chamber room in the vehicle top-bottom direction.

4. The collision detection sensor according to claim 1, further comprising:

a bumper absorber located between the bumper reinforcement and the bumper cover in the vehicle front-rear direction and located below the chamber room in the vehicle top-bottom direction, the bumper absorber being configured to absorb impact force caused by the collision, wherein the extension portion of the chamber member is located between the bumper reinforcement and the bumper absorber in the vehicle front-rear direction, and wherein the movable member is a portion of the bumper absorber.

5. The collision detection sensor according to claim 1, further comprising:

a bumper absorber located between the bumper reinforcement and the bumper cover in the vehicle front-rear direction and located below the chamber room in the vehicle top-bottom direction, the bumper absorber being configured to absorb impact force caused by the collision, wherein the extension portion of the chamber member is located between the bumper cover and the bumper absorber in the vehicle front-rear direction, and wherein the movable member is a portion of the bumper cover.

6. The collision detection sensor according to claim 1, wherein the touch sensor is mounted to a front surface of the bumper reinforcement in the vehicle front-rear direction.

7. The collision detection sensor according to claim 1, further comprising:

a bumper absorber located between the bumper reinforcement and the bumper cover in the vehicle front-rear direction and located below the chamber room in the vehicle top-bottom direction, the bumper absorber being configured to absorb impact force caused by the collision, wherein the touch sensor is mounted to a front surface of the bumper absorber in the vehicle front-rear direction.

8. A collision detection sensor for detecting a collision of a vehicle with an object, the collision detection sensor comprising:

a bumper reinforcement extending in a vehicle left-right direction;

a bumper cover located to cover space ahead of the bumper reinforcement in a vehicle front-rear direction, the bumper cover being configured to move toward a vehicle rear direction relative to the bumper reinforcement in the event of the collision;

a chamber member defining a chamber room therein and located between the bumper reinforcement and the bumper cover, the chamber room being deformed with the relative movement of the bumper cover to the bumper reinforcement;

a movable member configured to move with the relative movement of the bumper cover to the bumper reinforcement;

a pressure sensor configured to detect a pressure change in the chamber room;

a touch sensor located ahead of the bumper reinforcement in the vehicle front-rear direction and detecting contact with the movable member, the touch sensor and the chamber room being located at different positions in a vehicle top-bottom direction;

a determination circuit that determines whether the collision occurs based on the detection results of the pressure sensor and the touch sensor; and a bumper absorber located between the bumper reinforcement and the bumper cover in the vehicle front-rear direction and located below the chamber room in the vehicle top-bottom direction, the bumper absorber being configured to absorb impact force caused by the collision, wherein the touch sensor is mounted to a front surface of the bumper absorber in the vehicle front-rear direction.

9. The collision detection sensor according to claim 8, wherein the determination circuit determines whether the collision occurs based on the detection result of the pressure sensor, only when the touch sensor detects the contact with the movable member.

10. The collision detection sensor according to claim 8, wherein the touch sensor is located below the chamber room in the vehicle top-bottom direction.

11. The collision detection sensor according to claim 8, wherein the chamber member includes a body portion and an extension portion integrally formed with the body portion, the body portion defining the chamber room, the extension portion extending outward from an outer surface of the body portion, and wherein the touch sensor is mounted to the extension portion.

12. The collision detection sensor according to claim 11, wherein the extension portion of the chamber member is located between the bumper reinforcement and the bumper absorber in the vehicle front-rear direction, and wherein the movable member is a portion of the bumper absorber.

13. The collision detection sensor according to claim 11, wherein the extension portion of the chamber member is located between the bumper cover and the bumper absorber in the vehicle front-rear direction, and wherein the movable member is a portion of the bumper cover.

14. The collision detection sensor according to claim 8, wherein the touch sensor is mounted to a front surface of the bumper reinforcement in the vehicle front-rear direction.

* * * * *